United States Patent Office 2,765,611
Patented Oct. 9, 1956

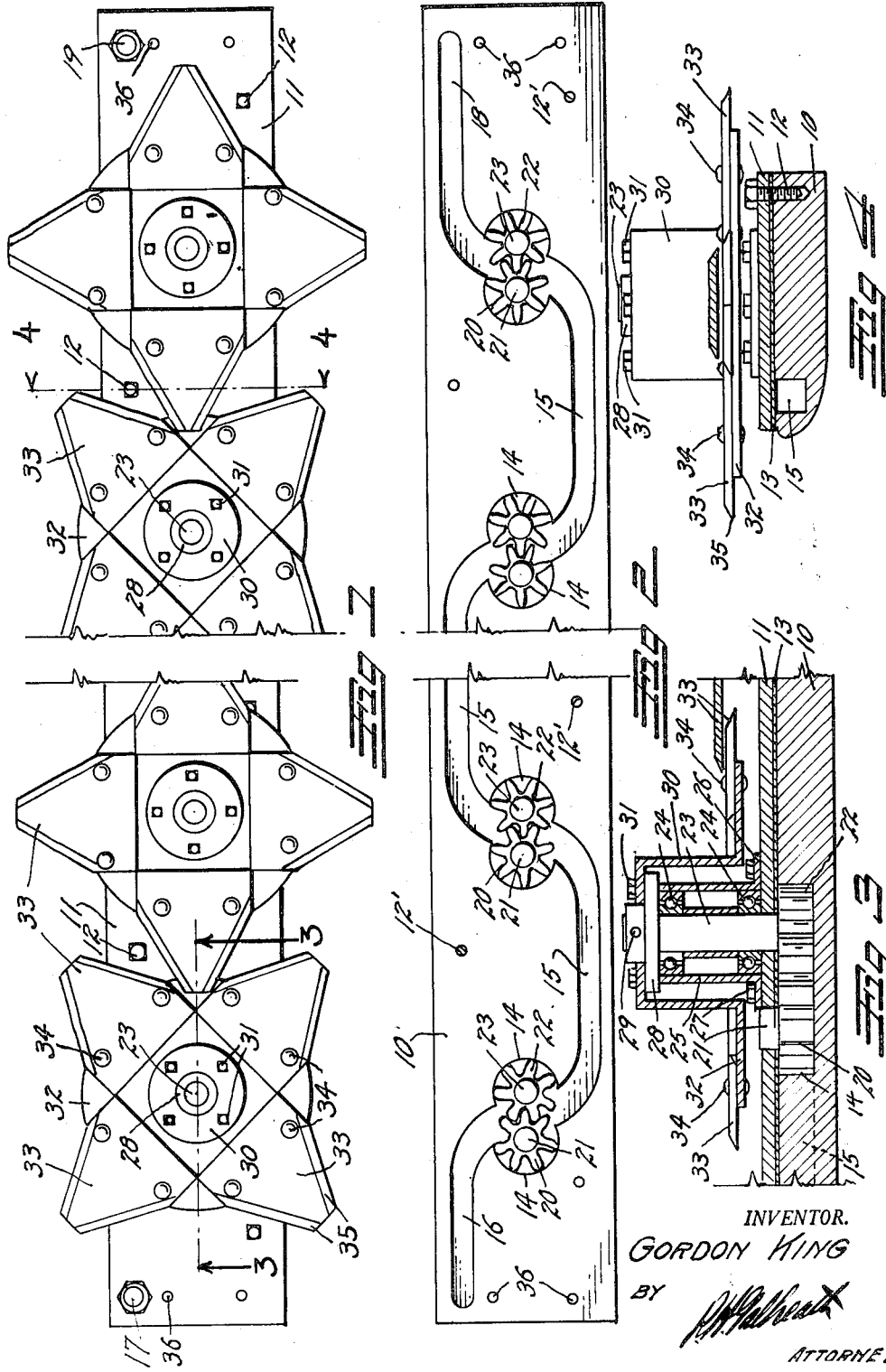

2,765,611

HYDRAULICALLY OPERATED MOWERS

Gordon King, Wray, Colo.

Application April 25, 1955, Serial No. 503,501

9 Claims. (Cl. 56—25.4)

This invention relates to a hydraulically operated mower unit for use in mowing any crop to which the usual sickle bar mower is adaptable. The principal object of this invention is to provide a hydraulically operated mower unit which can be quickly and easily attached to any crop mowing device, and which will eliminate all mechanical movements, such as pitmans, pitman rods, reciprocating sickle bars, etc., and which will simultaneously actuate a plurality of rotary cutter members in consequence of the flow of a hydraulic fluid.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary plan view of the terminal portions of the improved hydraulically operated mower unit;

Fig. 2 is a top view of the lower portion of the mower unit with a covering plate removed;

Fig. 3 is an enlarged fragmentary, longitudinal section, taken on the line 3—3, Fig. 1; and Fig. 4 is an enlarged cross-section therethrough, taken on the line 4—4, Fig. 1.

The improved hydraulic mower unit comprises an elongated, relatively thick, bottom bar 10, to the top of which a similarly shaped, relatively thin top plate 11 is secured by means of suitable cap screws 12 which engage tapped screw sockets 12' in the bar 10. A sealing gasket 13 is preferably positioned between the top plate 11 and the bottom bar 10. The bar 10 may have any desired length. In actual practice a length of 7'-0" has been found satisfactory.

A plurality of aligned pairs of gear sockets 14 are indented into the upper surface of the bottom bar 10 in spaced-apart relation. The adjacent pairs of motor gear sockets are interconnected in series by means of fluid passages 15 indented into the upper surface of the bottom bar 10. The number of pairs of gear sockets depends, of course, upon the length of the bar 10. In a seven foot bar eleven pairs of gear sockets would be employed.

An intake passage 16 is formed in the bottom bar 10 at one extremity thereof and terminates in the first pair of gear sockets 14. Hydraulic fluid under pressure is supplied to the intake passage 16 through an inlet nipple 17 communicating through the top plate 11. A similar outlet passage 18 extends from the terminal pair of gear sockets 14 and discharges fluid through the top plate 11 through an outlet nipple 19. While the nipples 17 and 19 have been designated as intake and outlet nipples, it is immaterial to the operation whether the fluid enters the nipple 17 or the nipple 19.

The passages 15 are so arranged that there will be a continuous flow of hydraulic fluid throughout the length of the bar 10 through each of the pairs of gear sockets 14 in succession. The nipples 17 and 19 are connected in any desired manner, such as through the medium of the usual flexible hydraulic hoses, with any conventional hydraulic pump of a type to maintain a constant flow of fluid through the passages.

An idler fluid motor gear 20 is positioned in one of the gear sockets of each pair of gear sockets. Each of the idler gears is provided with a pivot stud 21 which rotates in a bearing opening in the top plate 11. A second fluid motor gear 22, which will be herein designated as the drive gear, is positioned in the other socket 14 of each pair of sockets and in mesh with the adjacent idler motor gear 20.

Each of the drive gears 22 is provided with an upwardly extending drive shaft 23 which extends through an opening in the top plate 11. The drive shafts 23 are journalled in anti-friction bearings 24 mounted in separated relation within bearing sleeves 25. Each bearing sleeve 25 is provided with a lower peripheral flange 26 which is secured to the upper surface of the top plate 11, about the shaft opening therein, by means of suitable cap screws 27.

Each drive shaft 23 extends above its bearing sleeve 25. A hubbed drive disc 28 which is concentrically secured to the upper extremity of each shaft 23 in any desired manner, such as through the medium of a suitable set screw 29, and projects outwardly over the adjacent bearing sleeve 25 to provide a cap or cover for the latter.

A cup-shaped bearing housing 30 is inverted over each disc 28 and is provided with an axial opening through which the hub of the disc 28 projects. The housings 30 are fixedly secured to the adjacent discs 28 by means of suitable cap screws 31. An external circular riveting flange 32 is formed on and surrounds the open lower extremity of each housing 30. A plurality of cutting blades 33, preferably four, are secured to each of the riveting flanges 32 by means of suitable rivets 34, or in any other desired manner. The cutting blades project radially from the riveting flanges and are substantially triangular in shape to provide two inclined, sharpened cutting edges 35.

As can be seen from Fig. 2, the interconnecting fluid passages 15 are placed on alternate sides of the center line of the bar 10 so that the hydraulic fluid will flow through the pairs of gear cavities in alternately opposite directions so as to cause the motor gears to rotate the adjacent sets of cutting blades in opposite directions. Attachment bolt openings 36 are provided in each extremity of the bar 10 so that the bar 10 with its assembled mower mechanism may be mounted in any suitable mower structure which will enable the bar to travel immediately above the ground, with the whirling cutting blades extending forwardly therefrom to mow the crop as the mower structure advances.

In actual use the improved mower bar has been connected to a fluid pump delivering ten gallons of hydraulic fluid per minute to motor gears 1½" in diameter. A speed of 2000 R. P. M. was uniformly attained by the rotating cutting blades. Since the blades can be made to rotate in either desired direction by simply reversing the direction of flow of the fluid, it is possible to use the cutting edges at both sides of the blades before it is necessary to remove them for resharpening purposes. The blades can be quickly and easily removed when necessary by simply removing the cap screws 12. The height of the blades above the top plate 11 can be adjusted by setting the disc 28 at any desired height on the shaft 23 so that the adjacent sets of blades can be positioned in overlapping relation as shown in Fig. 3.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passages; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; and a crop cutting device mounted on each drive shaft.

2. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passages; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; a bearing sleeve mounted on said top plate about each motor shaft; bearings in each sleeve rotatably supporting said shaft therein; and a crop cutting device mounted on the upper extremity of each shaft above said sleeve.

3. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passages; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; a bearing sleeve mounted on said top plate about each motor shaft; bearings in each sleeve rotatably supporting said shaft therein; a disc secured to each motor shaft above the bearing sleeve thereon; a housing fixedly mounted on each disc; and radially projecting cutting blades secured to each of said housings, said blades projecting transversely beyond said bar.

4. A hydraulic mower as described in claim 3 in which the housings comprise inverted, cup-shaped members secured at their upper extremities to said discs, and extending downwardly about said bearing sleeves and provided with projecting flanges around their lower extremities, said cutting blades being secured to said flanges.

5. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passage; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; bearing means mounted on said top plate rotatably and vertically supporting each drive shaft; an inverted cup-shaped housing secured adjacent the upper extremity of each shaft and extending downwardly thereabout; and a plurality of cutting blades secured to and projecting radially from said housing adjacent to and above said top plate.

6. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passage; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; bearing means mounted on said top plate rotatably and vertically supporting each drive shaft; an inverted cup-shaped housing secured adjacent the upper extremity of each shaft and extending downwardly thereabout; a peripheral external flange formed on the lower extremity of said housing; and a plurality of radially projecting cutting blades mounted on said flange.

7. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passage; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; bearing means mounted on said top plate rotatably and vertically supporting each drive shaft; a disc removably secured upon and adjacent the upper extremity of each drive shaft; a cup-shaped housing inverted over each disc and extending downwardly thereabout to a termination adjacent said top plate; detachable means securing said housing to said disc; and a plurality of cutting blades secured to and projecting from said housing in a horizontal plane above said top plate.

8. A hydraulic mower comprising: an elongated horizontal bar; a plurality of pairs of motor gear sockets indented into the upper surface of said bar; a feed passage in said bar supplying fluid to the first pair of gear sockets; an outlet passage indented in said bar and discharging fluid from the terminal pair of gear sockets; intermediate passages indented in said bar and communicating between the adjacent pairs of gear sockets between said inlet and said outlet passage; an idler motor gear positioned in one socket of each pair; a drive motor gear positioned in the other socket of each pair in mesh with the adjacent idler motor gear; a top plate covering said sockets and said motor gears; a drive shaft extending upwardly through said top plate from each of said motor gears; bearing means mounted on said top plate about each drive shaft rotatably and vertically supporting the latter; a disc secured upon the upper extremity of each drive shaft; a cup-shaped housing having an open lower extremity inverted over each disc and extending downwardly thereabout and about said bearing means and terminating closely adjacent to the upper surface of said top plate; means securing each housing to a disc; a peripheral flange surrounding the open lower extremity of each housing; and a plurality of horizontally extending cutting blades secured to each flange and projecting radially therefrom beyond a side edge of said horizontal bar.

9. A hydraulic mower as described in claim 8 in which the cutting blades of adjacent flanges are arranged in overlapping relation.

References Cited in the file of this patent

UNITED STATES PATENTS

| | | |
|---|---|---|
| 2,038,284 | Hanson | Apr. 21, 1936 |
| 2,523,014 | Gooch | Sept. 19, 1950 |